US012782300B2

(12) United States Patent
Pelliccione et al.

(10) Patent No.: US 12,782,300 B2
(45) Date of Patent: Nov. 3, 2026

(54) METHOD AND APPARATUS FOR USING RADIATION IMAGING DATA TO ANALYZE COMPONENTS

(71) Applicant: RTX CORPORATION, Farmington, CT (US)

(72) Inventors: Christopher Pelliccione, Tolland, CT (US); Iuliana Cernatescu, Glastonbury, CT (US); Robert Koch, Hartford, CT (US); David Furrer, Marlborough, CT (US); Ryan Breneman, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 364 days.

(21) Appl. No.: 18/654,809

(22) Filed: May 3, 2024

(65) Prior Publication Data

US 2024/0369503 A1 Nov. 7, 2024

Related U.S. Application Data

(60) Provisional application No. 63/464,465, filed on May 5, 2023.

(51) Int. Cl.
*G01N 23/203* (2006.01)
*G01N 23/04* (2018.01)
*G01N 23/16* (2018.01)

(52) U.S. Cl.
CPC ........... *G01N 23/203* (2013.01); *G01N 23/04* (2013.01); *G01N 23/16* (2013.01)

(58) Field of Classification Search
CPC ...... G01N 23/203; G01N 23/04; G01N 23/16; G01N 2223/313; G01N 2223/32; G01N 2223/604; G01N 2223/646; G01N 23/2055

(Continued)

(56) References Cited

U.S. PATENT DOCUMENTS 6,005,913 A 12/1999 Zombo et al.
8,605,858 B2 12/2013 Singh et al.

(Continued)

OTHER PUBLICATIONS

Liu et al., "Dynamic bowtie filter for cone-beam/multi-slice CT", PLOS ONE, vol. 9, No. 7, Jul. 22, 2014.

(Continued)

*Primary Examiner* — Michael Maskell
(74) *Attorney, Agent, or Firm* — Carlson, Gaskey & Olds, P.C.

(57) ABSTRACT

An example system for analyzing a component includes a radiation source configured to transmit an input radiation beam towards a component, at least a portion of the input radiation beam passing through the component as an output beam pattern; a radiation detector configured to detect the output beam pattern; and a beam adjustment device disposed between the radiation source and the component and configured to modify a radiation intensity profile of the input radiation beam, wherein the beam adjustment device has an adjustable radiation transparency. A method of analyzing a component is also disclosed, which includes transmitting an input radiation beam from a radiation source towards a component, at least a portion of the input radiation beam passing through the component as an output beam pattern; modifying a radiation intensity profile of the input radiation beam by passing the input radiation beam through a beam adjustment device disposed between the radiation source and the component, wherein the beam adjustment has an adjustable radiation transparency; and detecting the output beam pattern at a radiation detector.

20 Claims, 6 Drawing Sheets

(58) Field of Classification Search
USPC ................................ 250/306, 307, 310, 311
See application file for complete search history.

(56) References Cited

U.S. PATENT DOCUMENTS

| | | | |
|---|---|---|---|
| 9,939,393 | B2 | 4/2018 | Cerntaescu et al. |
| 10,976,267 | B2 | 4/2021 | Fujita et al. |
| 11,099,143 | B2 | 8/2021 | Griffiths et al. |
| 11,181,491 | B2 | 11/2021 | Cernatescu et al. |
| 2018/0088347 | A1 | 3/2018 | Van Der Zouw et al. |
| 2021/0025835 | A1 | 1/2021 | Griffiths et al. |
| 2023/0118850 | A1* | 4/2023 | Dicken .................. G01V 5/222 378/87 |

OTHER PUBLICATIONS

Shunhavanich et al., “Fluid-filled dynamic bowtie filter: Description and comparison with other modulators”, Database Medline, US National Library of Medicine, Jan. 2019.
Extended European Search Report for European Patent Application No. 24174187.5 dated Oct. 16, 2024.

* cited by examiner

METHOD AND APPARATUS FOR USING RADIATION IMAGING DATA TO ANALYZE COMPONENTS

CROSS-REFERENCE TO RELATED APPLICATIONS

This application claims the benefit of Provisional U.S. Provisional Patent Application No. 63/464,465 filed May 5, 2023; the disclosure of which is incorporated by reference in its entirety herein.

BACKGROUND

This application relates to component inspection, and more particularly to a method and apparatus for using radiation imaging data, including elastic scattering, for analyzing a component.

In connection with an aircraft, single-crystal (SX) superalloy components are known to provide beneficial mechanical properties at high temperatures necessary for efficient engine operation. However, during the manufacture of such components, there are several crystallographic anomalies that may be realized. Such anomalies may include recrystallized grains (RX), secondary grains, freckles, slivers grains, and misaligned primary dendrite.

In instances where anomalies, especially RX, occur in the interior of the component or on a region which is covered by a coating, the detection of the anomalies by non-destructive techniques (with respect to the component) is not possible with conventional technology.

SUMMARY

A system for analyzing a component according to an example embodiment of the present disclosure includes a radiation source configured to transmit an input radiation beam towards a component. At least a portion of the input radiation beam passes through the component as an output beam pattern. The system also includes a radiation detector configured to detect the output beam pattern, and a beam adjustment device disposed between the radiation source and the component. The beam adjustment device is configured to modify a radiation intensity profile of the input radiation beam, and the beam adjustment device has an adjustable radiation transparency.

In a further embodiment of the foregoing embodiment, the system includes a controller configured to receive a selection of a radiation intensity profile for the input radiation beam and adjust the radiation transparency of the beam adjustment device based on the selection.

In a further embodiment of any of the foregoing embodiments, the beam adjustment device includes a plate having an aperture, and the controller is configured to adjust the radiation transparency of a portion of the plate that at least partially surrounds the aperture.

In a further embodiment of any of the foregoing embodiments, the portion of the plate that at least partially surrounds the aperture includes a cavity or an opening, and the controller is configured to add or remove a filler from the cavity or opening to adjust the radiation transparency of the cavity or opening.

In a further embodiment of any of the foregoing embodiments, the controller is configured to select from one of a plurality of different fillers having different densities to achieve the selected radiation intensity profile of the input radiation beam.

In a further embodiment of any of the foregoing embodiments, the controller is configured to use a liquid filler in the cavity.

In a further embodiment of any of the foregoing embodiments, the controller is configured to use a solid filler in the opening.

In a further embodiment of any of the foregoing embodiments, the system includes a plurality of plates having different radiation transparency profiles. The controller is configured to selectively add and remove different ones of the plates from the beam adjustment device to achieve the selected radiation intensity profile of the input radiation beam.

In a further embodiment of any of the foregoing embodiments, at least one of the plurality of plates has a varying thickness.

In a further embodiment of any of the foregoing embodiments, the controller is configured to compare the detected output beam pattern with a reference beam pattern and detect whether an anomaly exists in a crystalline structure of the component based on the comparison.

In a further embodiment of any of the foregoing embodiments, the component includes one or more superalloy components.

In a further embodiment of any of the foregoing embodiments, the component includes one or more single-crystal (SX) superalloy components.

A method of analyzing a component according to an example embodiment of the present disclosure includes transmitting an input radiation beam from a radiation source towards a component. At least a portion of the input radiation beam passes through the component as an output beam pattern. The method also includes modifying a radiation intensity profile of the input radiation beam by passing the input radiation beam through a beam adjustment device disposed between the radiation source and the component. The beam adjustment has an adjustable radiation transparency. The method also includes detecting the output beam pattern at a radiation detector.

In a further embodiment of the foregoing embodiment, the method includes receiving a selection of a radiation intensity profile for the input radiation beam and adjusting the radiation transparency of the beam adjustment device based on the selection.

In a further embodiment of any of the foregoing embodiments, the beam adjustment device includes a plate having an aperture, and the adjusting includes adjusting the radiation transparency of a portion of the plate that at least partially surrounds the aperture.

In a further embodiment of any of the foregoing embodiments, the portion of the plate that at least partially surrounds the aperture includes a cavity or an opening, and the adjusting includes adding or removing a filler from the cavity or opening to adjust the radiation transparency of the cavity or opening.

In a further embodiment of any of the foregoing embodiments, the adjusting includes selecting from one of a plurality of different fillers having different densities to achieve the selected radiation intensity profile of the input radiation beam.

In a further embodiment of any of the foregoing embodiments, the adjusting includes adding a liquid filler to the cavity, or removing the liquid filler from the cavity.

In a further embodiment of any of the foregoing embodiments, the adjusting includes adding a solid filler to the cavity, or removing the solid filler from the opening.

In a further embodiment of any of the foregoing embodiments, the adjusting includes selectively adding and removing different ones of a plurality of plates having different radiation transparency profiles from the beam adjustment device to achieve the selected radiation intensity profile of the input radiation beam.

In a further embodiment of any of the foregoing embodiments, at least one of the plurality of plates has a variable thickness.

In a further embodiment of any of the foregoing embodiments, the method includes comparing the detected output beam pattern with a reference beam pattern and detecting whether an anomaly exists in a crystalline structure of the component based on the comparison.

In a further embodiment of any of the foregoing embodiments, the component includes one or more superalloy components.

In a further embodiment of any of the foregoing embodiments, the component includes one or more single-crystal (SX) superalloy components.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
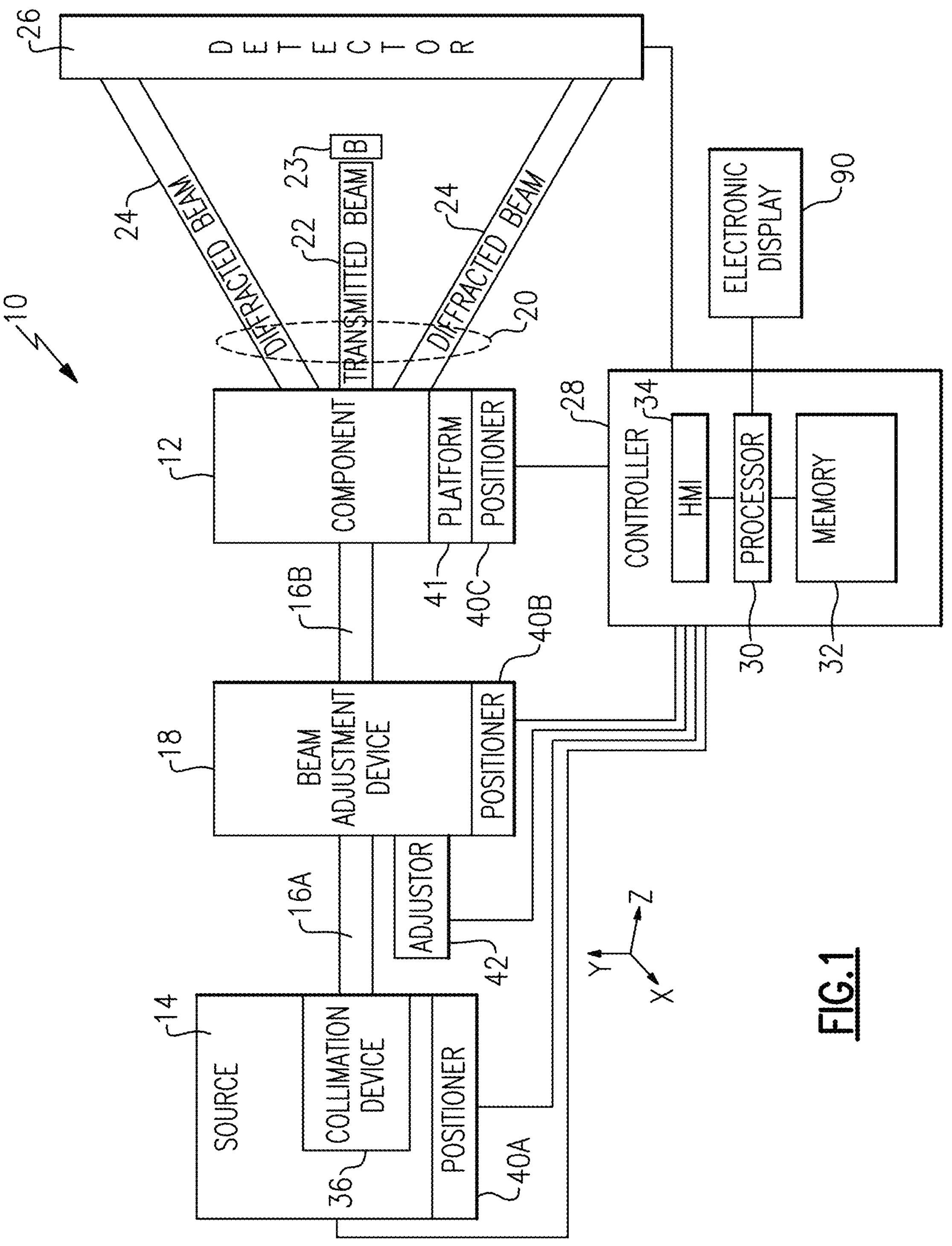
FIG. 1 schematically illustrates an example system for analyzing a component.

FIG. 1 schematically illustrates an example system 10 for analyzing a component 12 using clastic scattering. Elastic scattering refers to a technique in which radiation (e.g., X-rays) is applied to a component, and the radiation that passes through and interacts with the component is measured to analyze the component. In FIG. 1, the component 12 may be a part of a gas turbine engine, such as a rotor blade or turbine vane, for example. The component 12 has a crystalline structure (e.g., the component 12 may be a nominally single-crystal "SX" component), and the system 10 may be used to detect sub-surface crystallographic imperfections in the component 12 as part of non-destructive testing.

The system includes a radiation source 14 configured to transmit an input radiation beam 16A towards the component 12. At least a portion of the input radiation beam 16A passes through the component 12 as an output beam pattern 20 that includes a transmitted beam 22 and one or more diffracted beams 24. In one example, the input radiation is provided as an X-ray having an energy range of 30 keV-600 keV. In a further example, the energy range is 30 keV-40 keV. The radiation beam 16A may include an X-ray, for example.

A beam adjustment device 18 is disposed between the radiation source 14 and the component 12, and is configured to modify a radiation intensity profile and optionally also a shape of the input radiation beam 16A to provide a modified radiation beam 16B. As will be discussed in further detail below, the beam adjustment device 18 has an adjustable radiation transparency, which can be used to modify the radiation intensity profile of the radiation beam 16. The radiation intensity profile of the radiation beam 16 represents how radiation intensity varies in the radiation beam, and in some examples also how different regions of intensity are shaped, both of which correspondingly affect the output beam pattern 20.

The beam adjustment device 18 includes one or more plates that the input radiation beam 16 passes through. The radiation transparency of the beam adjustment device 18 is adjustable due to selection of different plates from a set of plates and/or due to modification of the density of one or more plates. By utilizing shapes with various apertures (e.g., slit-shaped apertures having a width of 100 μm to 15 cm), the beam adjustment device 18 may be utilized to provide a variety of different beam shapes, such as horizontal or vertical fan beams.

A radiation detector 26 is configured to detect the output beam pattern 20, and to provide imaging data representing the output beam pattern 20 to a controller 28. In the example of FIG. 1, a blocker 23 is positioned to at least partially block the transmitted beam 22 from reaching the radiation detector 26, in order to avoid overexposure of the imaging data that would likely otherwise occur if the transmitted beam was not blocked. Instead of blocking, a hole may be provided in the detector 26 to at least partially allow the transmitted beam to pass through, or the detector may be moved so that the radiation detector 26 is not in the path of the transmitted beam 22. The radiation detector 26 captures radiation imaging data of the output beam pattern 20 (with the transmitted beam 22 being at least partially blocked by blocker 23), and provides the radiation imaging data to the controller 28. The radiation imaging data includes elastic scattering data (which includes data from the one or more diffracted beams 24) and may also include non-clastic scattering data corresponding to radiation that is absorbed and not diffracted by the component 12).

The controller 28 includes a processor 30 operatively connected to memory 32. The processor 30 includes processing circuitry such as one or more microprocessors, microcontrollers, application specific integrated circuits (ASICs), or the like. The memory 32 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 32 may incorporate electronic, magnetic, optical, and/or other types of storage media.

In one or more examples, the processor 30 is configured to compare the detected output beam pattern 20 (as represented by the imaging data received from the radiation detector 26) with a reference beam pattern stored in the memory 32, and detect whether an anomaly exists in a crystalline structure of the component 12 based on the comparison. To perform this, the processor 30 may use known techniques such as Ewald constructions and Braggs law. Some example anomalies may include recrystallized grains (RX), secondary grains, freckles, slivers grains, and misaligned primary dendrites, for example. Such defects affect the one or more diffracted beams 24, and cause the diffracted beam(s) 24 to appear differently in the imaging data captured by the radiation detector 26 than in the reference beam pattern. By utilizing these comparisons, the controller 28 facilitates for non-destructive testing of crystallographic components by using radiation and elastic scattering. The controller may be configured to display captured imaging data on electronic display 90, for example.

The radiation source 14 may include a collimation device 36 to control a size or initial shape of the input radiation beam 16A, such as controlling whether the beam 16 is provided a conical beam (and in at least one example also an angle of divergence of the conical beam) or as a parallel/pencil beam.

The controller 28 is configured to control the radiation source 14, such as whether the beam 16 is on or off, an intensity of the beam 16 (e.g., according to the energy ranges discussed above), and/or a shape of the beam 16 (e.g., parallel or non-parallel). In one or more examples, the controller 28 uses the collimation device 36 to control an initial shape of the beam 16 as discussed above.

The controller 28 is also configured to control one or more positioners 40A-C to provide a desired input radiation beam 16 with a desired radiation intensity profile to a particular portion of the component 12.

Positioner 40A is configured to move the radiation source 14 relative to the component 12 and beam adjustment device 18 along the X, Y and/or Z axes shown in FIG. 1. The positioner 40A and may be configured to move the beam 16 to provide a desired rastering pattern on the radiation detector 26, for example.

Positioner 40B is configured to control a position and/or orientation of the beam adjustment device 18 by, e.g., by moving the beam adjustment device 18 relative to the component 12 and/or radiation source 14 along X, Y, and/or Z axes as shown in FIG. 1. In one or more examples, the positioner 40B is configured to rotate a plate of the beam adjustment device 18 so that the plate (and its corresponding aperture) can be rotated using automation provided by the positioner 40B (e.g., as much as 360 degrees, which may correspond to 180 degrees counter clockwise and 180 degrees clockwise from a starting position).

Positioner 40C is configured move the component, and may be a multiple axis encoded manipulator, such as a 5-axis manipulator configured to move the component 12 in the X, Y, and/or Z axes, rotating a platform 41 on which the component 12 is situated, and/or tilting the component 12. Positioner 40C may include a clamp for clamping the component 12 to the platform 41, and/or may include one or more robotic arms for manipulating a position and/or orientation of the component 12 with respect to the input radiation beam 16.

As will be discussed in greater detail below, an adjustor 42 is provided that is configured to adjust a radiation transparency of the beam adjustment device 18.

The controller 28 includes a human machine interface ("HMI") 34 for interacting with a user, receiving a selection of a radiation intensity profile for the input radiation beam 16, and optionally also receiving a desired shape of the radiation beam. The controller 28 is configured to adjust the radiation transparency of the beam adjustment device 18 based on the selection.

Figure 2A:
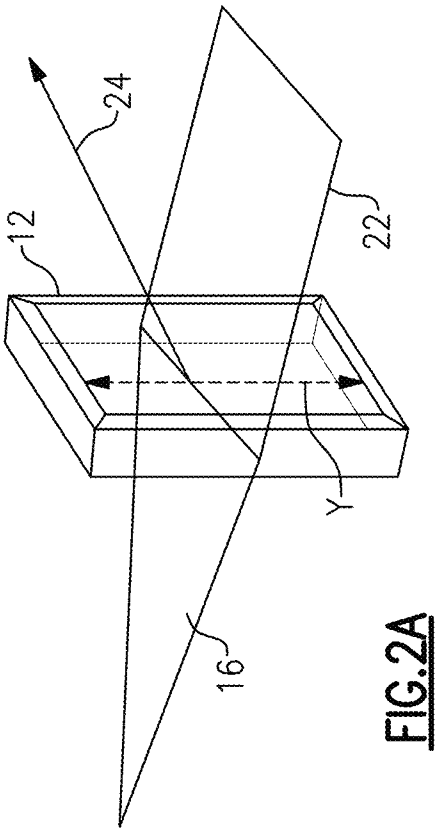
FIG. 2A schematically illustrates a first example beam configuration.

FIG. 2A illustrates a first example beam configuration in which the input radiation beam 16 is a horizontal fan beam that yields a horizontal fan transmitted beam 22 and also a diffracted beam 24. The controller 28 utilizes positioner 40A, 40B, and/or 40C to move the depicted fan beam 16 vertically along axis Y (which corresponds to axis Y of FIG. 1).

Figure 2B:
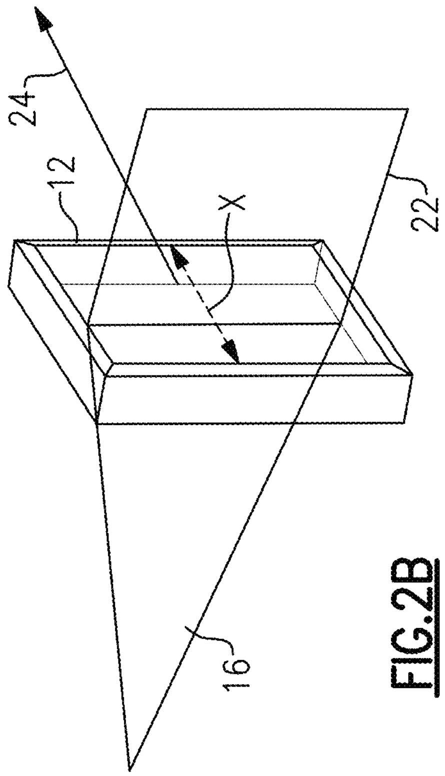
FIG. 2B schematically illustrates a second example beam configuration.

FIG. 2B illustrates a second example beam configuration in which the input radiation beam 16 is a vertical fan beam that yields a vertical fan transmitted beam 22 and also a diffracted beam 24. The controller 28 may utilize positioner 40A, 40B, and/or 40C to move the depicted fan beam 16 laterally along axis X (which corresponds to axis X of FIG. 1).

Figure 3:
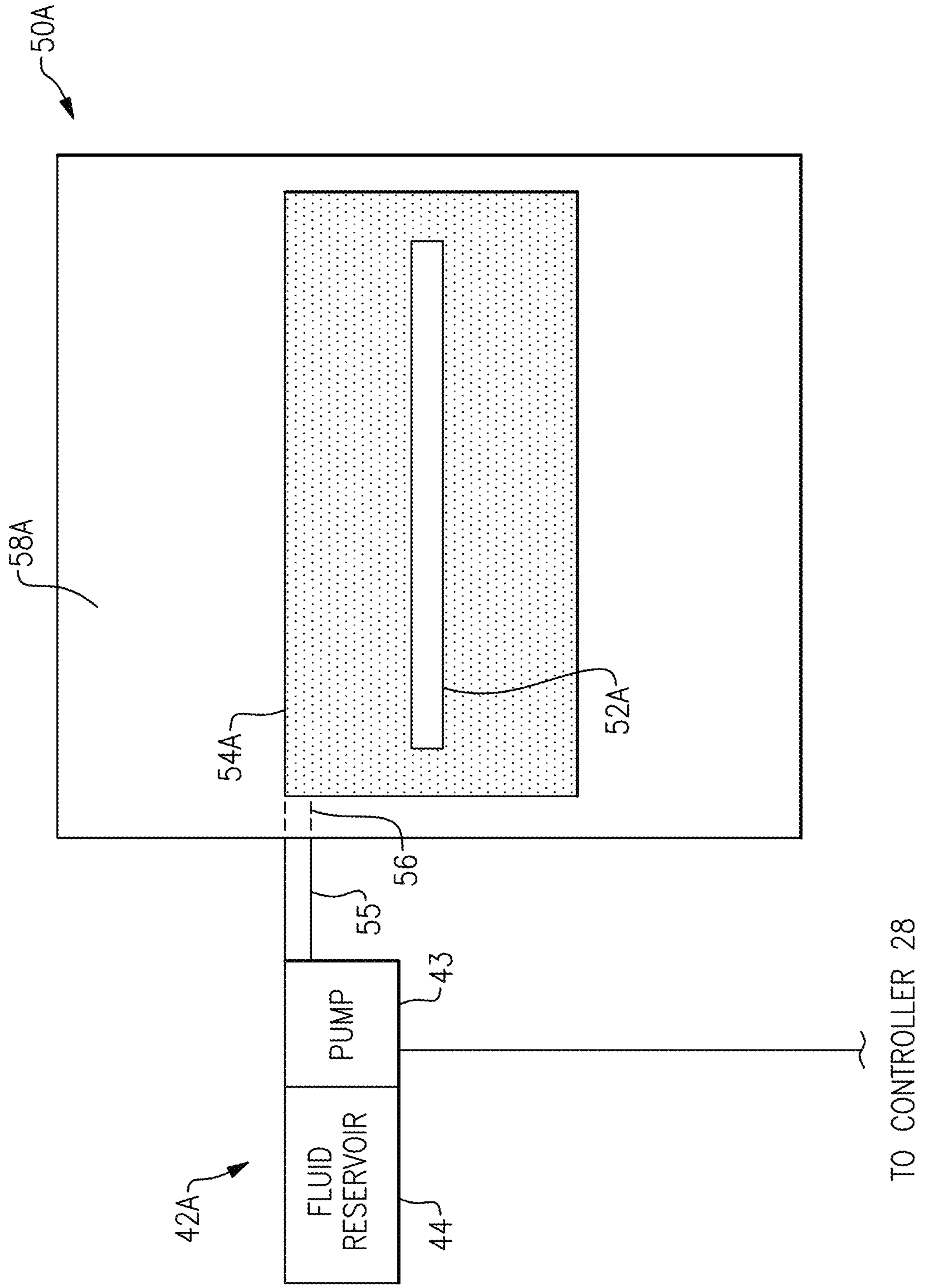
FIG. 3 schematically illustrates a first example plate that may be used in a beam adjustment device of FIG. 1.
Figure 4:
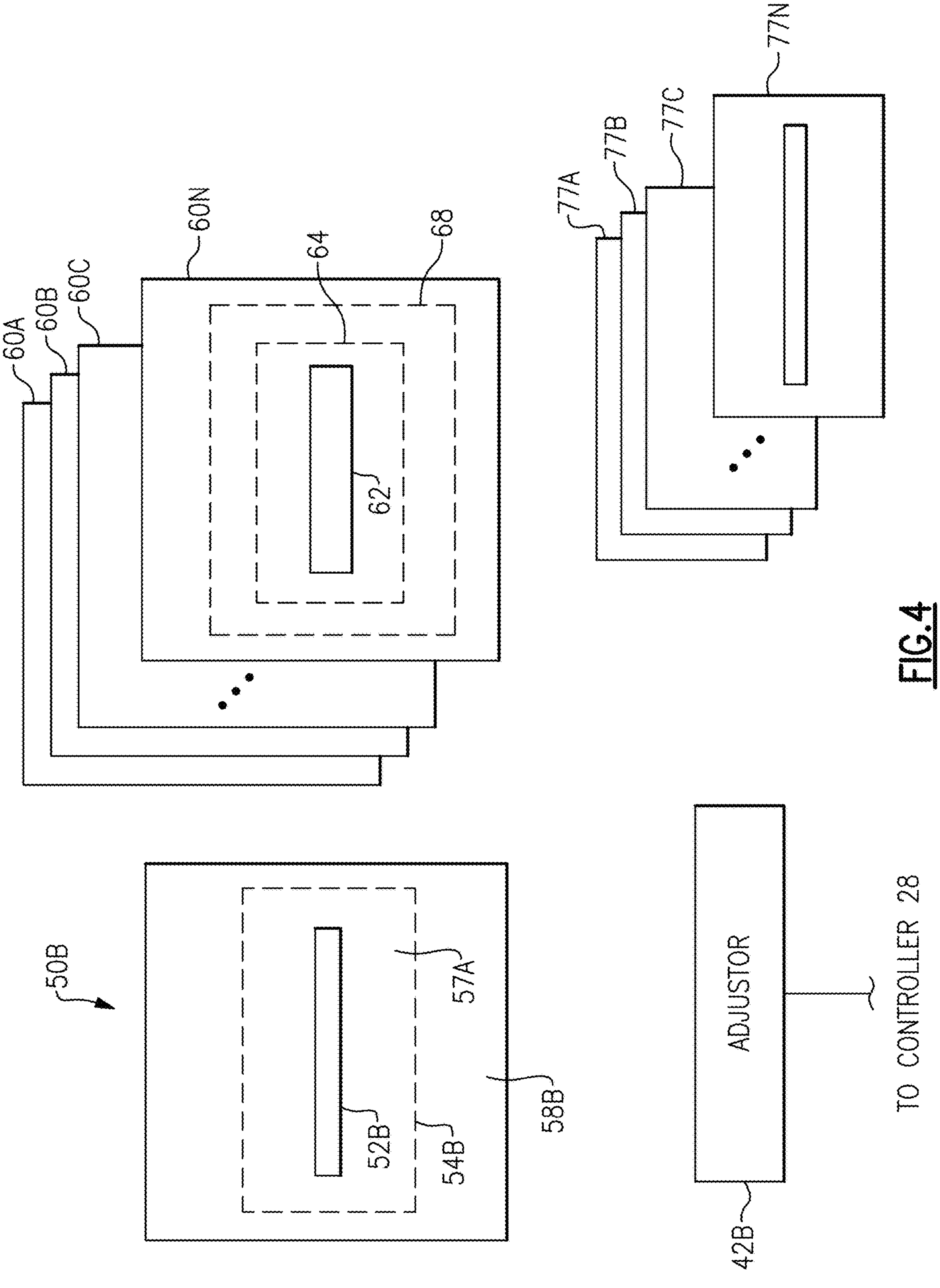
FIG. 4 schematically illustrates another example plate that may be used in the beam adjustment device of FIG. 1.

Referring now to FIGS. 3-4, an example implementation of the beam adjustment device 18 is depicted in which the beam adjustment device 18 includes a plate 50A (FIG. 3) and a plate 50B (FIG. 4), with both plates 50A-B having a respective corresponding aperture 52A-B. The controller 28 is configured to adjust the radiation transparency of a portion of the plates 50A-B that at least partially surrounds the apertures 52A-B. In these examples, a portion of the plates 50A-B that at least partially surrounds the apertures 52A-B includes a cavity 54A or an opening 54B, and the controller 28 is configured to add or remove a filler from the cavity 54A or opening 54B to adjust the radiation transparency of the cavity 54A or opening 54B. In one or more examples, the controller 28 is configured to select from one of a plurality of different fillers having different densities to achieve the selected intensity profile of the input radiation beam 16.

FIG. 3 schematically illustrates a first example plate 50A that may be used in the beam adjustment device 18 of FIG. 1. The plate 50A includes an aperture 52A that is slit-shaped and is surrounded by a cavity 54A. In the example of FIG. 3, the adjuster 42A includes a pump 43 and fluid reservoir 44, and the controller 28 is configured to adjust a radiation transparency of the cavity 54A by operating the pump 43 to pump a liquid filler from the fluid reservoir 44 into the cavity 54A through a conduit 55 and fluid passage 56.

It is known that density of a material is correlated with the radiation transparency of the material. Thus, lead, which is very dense, has a very low radiation transparency, while less dense materials, such as those containing aluminum, silicon, etc., are less dense and therefore have a relatively high radiation transparency. In one or more examples, the fluid reservoir 56 includes a plurality of fluids having different densities, and the controller 28 is configured to select a particular one of the fluids based on the radiation intensity profile selected by a user. Some example fluids that may be used include mercury, oxide slurry, heavy ion solutions, and/or metallic slurry.

The aperture 52A has a first radiation transparency R1 (e.g., 100% transparency), and the cavity 54A has a second radiation transparency R2 (which may vary depending on whether the cavity is empty or is filled with fluid from fluid reservoir 44, and also on which fluid is used to fill the cavity). An area 58A of the plate 50A that surrounds the cavity 54A has a third radiation transparency R3, where R3<R2<R1. The controller 28 may select a fluid to fill the cavity to vary the value of R2 (e.g., such that R2 changes but does not exceed R1 and does not fall below R3).

FIG. 4 schematically illustrates another example plate 50B that may be used in the beam adjustment device 18 of FIG. 1, but which uses a solid instead of a liquid filler, in the form of a filler insert 57. The plate 50B has an aperture 52B having a first radiation transparency R1' (e.g., 100% transparency), an area 54B surrounding the aperture 52B is an opening into which the filler insert 57A is situated. The filler insert 57A has a second radiation transparency R2', and an area 58B of the plate 50B that surrounds the filler insert 57A has a third radiation transparency R3'. In one example, R3'<R2'<R1'.

Assume for the discussion below that the beam adjustment device 18 is initially configured to use only plate 50B to modify the beam 16A. In this example, the adjustor 42B may adjust a radiation transparency of the beam adjustment device 18 by adding one or more additional plates of a plurality of plates 60A-N.

The additional plates 60A-N may have a variety of different configurations. For example, they may include their own apertures 62 having their own radiation transparency R1" (with their apertures 62 being sized and/or oriented the same as or different than the aperture 52B), and may also include a region 64 surrounding their apertures and having a second radiation transparency R2", which is surrounded by area 68 having a third radiation transparency R3" (e.g., where R3"<R2"<R1"). Of course, different configurations could be used, such as having the areas 64, 68 having the same or approximately the same radiation transparency. One or more of the plates 60A-N may include removable filler inserts, for example.

In one or more examples, the adjustor 42B adjusts a radiation transparency of the plate 50B by replacing the filler insert 57A with one of a plurality of additional filler inserts 77A-N that are sized to fit into the opening 54B and have a variety of different radiation transparency profiles.

The adjustor 42B may include one or more robotic arms or actuators to effect the adjustments (e.g., plate additions, plate removals, filler insert insertions, and/or filler insert removals), using known techniques for moving parts. The controller 28 in one or more examples is configured to selectively add and/or remove different plates from the beam adjustment device 18 to achieve the selected radiation intensity profile of the input radiation beam 16.

Figure 5:
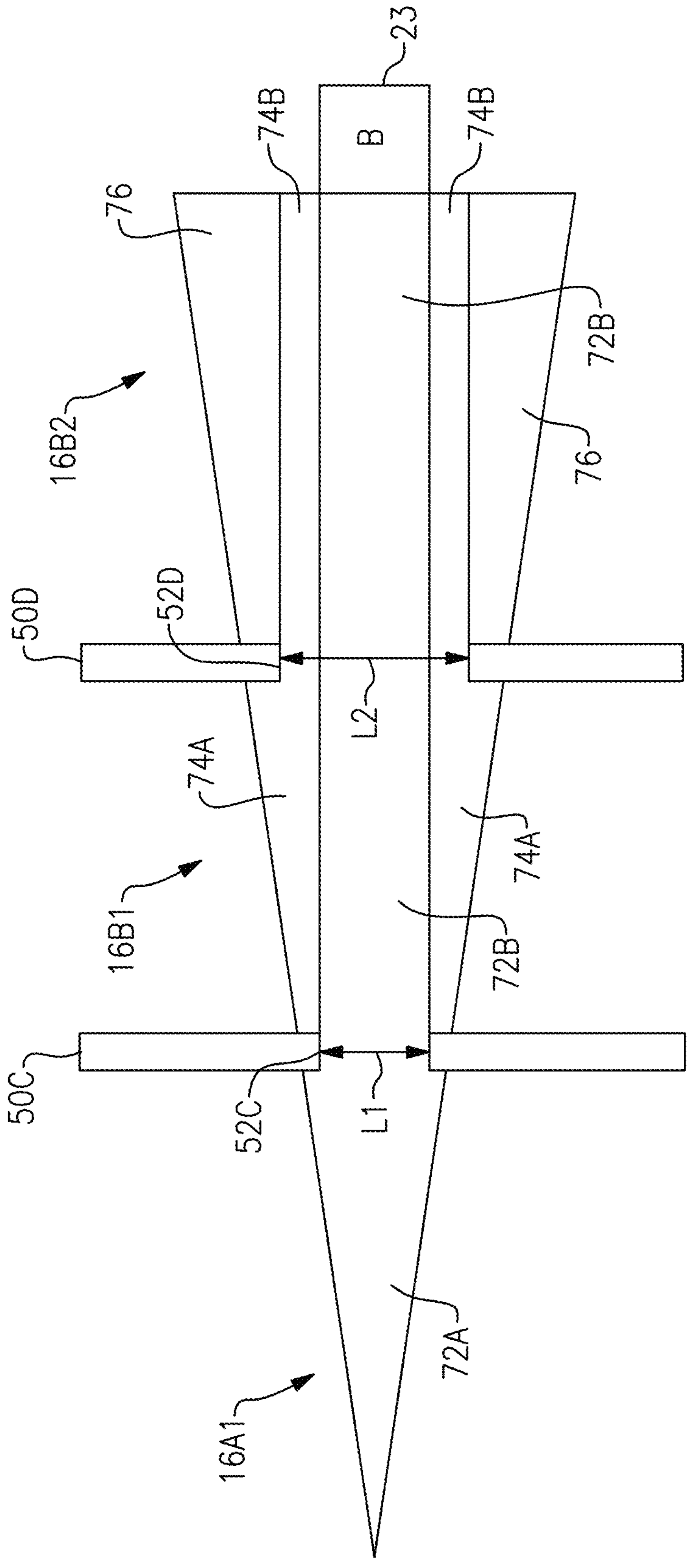
FIG. 5 schematically illustrates an example plate configuration for the beam adjustment device of FIG. 1 which utilizes a plurality of plates.

FIG. 5 schematically illustrates an example plate configuration for the beam adjustment device 18, which uses a conical input radiation beam 16A1 and a plurality of plates 50C-D. Plate 50C includes an aperture 52C having a length L1, and plate 50D includes an aperture 52D having a length L2 that is greater than L1.

The input radiation beam 16A1 has a beam area 72A having a first intensity I1. The plate 50C modifies the beam 16A1 to provide a first modified beam 16B1. In particular, the plate 50C reduces a size of the beam area 72A to an area 72B that passes through the aperture 52C and still has the intensity I1. The plate 50C also yields a beam area 74A that passes through the plate 50C around the aperture 52C, and has an intensity I2 where I2<I1.

The second plate 50D modifies the beam 16B1 to provide a second modified beam 16B2 that includes the beam area 72B (which passes through the aperture 52D), and that reduces a size of the beam area 74A to an area 74B that also passes through the aperture 52D and that still has the intensity I2. The plate 50D also yields a beam area 76 that passes through the plate 50D around the aperture 52D, and has an intensity I3 where I3<I2<I1. Additional plates could be added if desired, and the same techniques could be utilized for a parallel or "pencil" radiation beam if desired to achieve a desired radiation intensity profile. Blocker 23 may be used to block the beam area 72B from reaching the detector.

Figure 6:
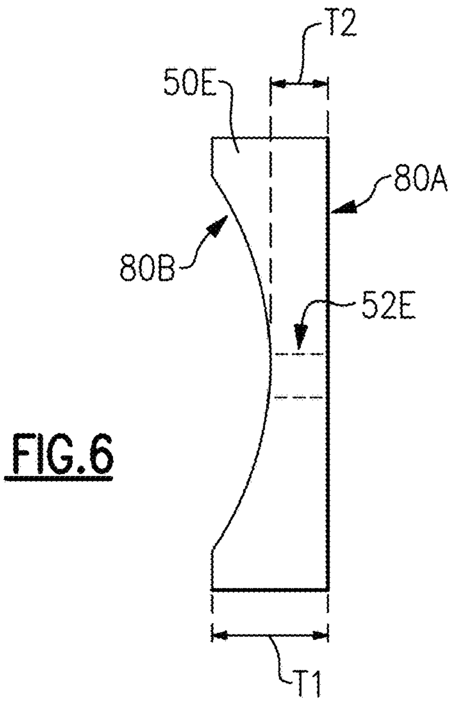
FIG. 6 schematically illustrates an example plate for the beam adjustment device of FIG. 1 having a variable width.

FIG. 6 schematically illustrates another example plate 50E that has a varying thickness and may be used in the beam adjustment device 18 of FIG. 1. The plate 50E includes an aperture 52E for the input radiation to pass through. The plate 50B includes opposing faces 80A-B. Face 80A is generally planar, and face 80B is concave, such that a thickness of the plate varies from thickness T1 at outer edges of the plate 50E to thickness T2 at the aperture 52E that is smaller than T1. By utilizing a varying thickness, the plate 50E has a varying radiation transparency as well.

Using the plate features described above, or other plate features, the adjustor 42 is operable to achieve a desired radiation intensity profile of the radiation input beam 16. Thus, the beam adjustment device 18 can achieve its adjustable radiation transparency through any one or more of the techniques discussed above, namely, selecting plates with varying thicknesses, selecting plates with different radiation transparency areas, filling plate cavities with different density liquids, or inserting filler inserts into plate openings. The beam adjustment device 18 may use a single plate, or multiple stacked plates (which may abut each other, or may be spaced apart from each other along the axis Z of FIG. 1, for example).

Although only slit apertures are primarily shown above, it is understood that other aperture geometries could be used, to correspondingly control the shape of the various beam areas (e.g., beam areas 72B, 74B, and 76 in FIG. 5).

Figure 7:
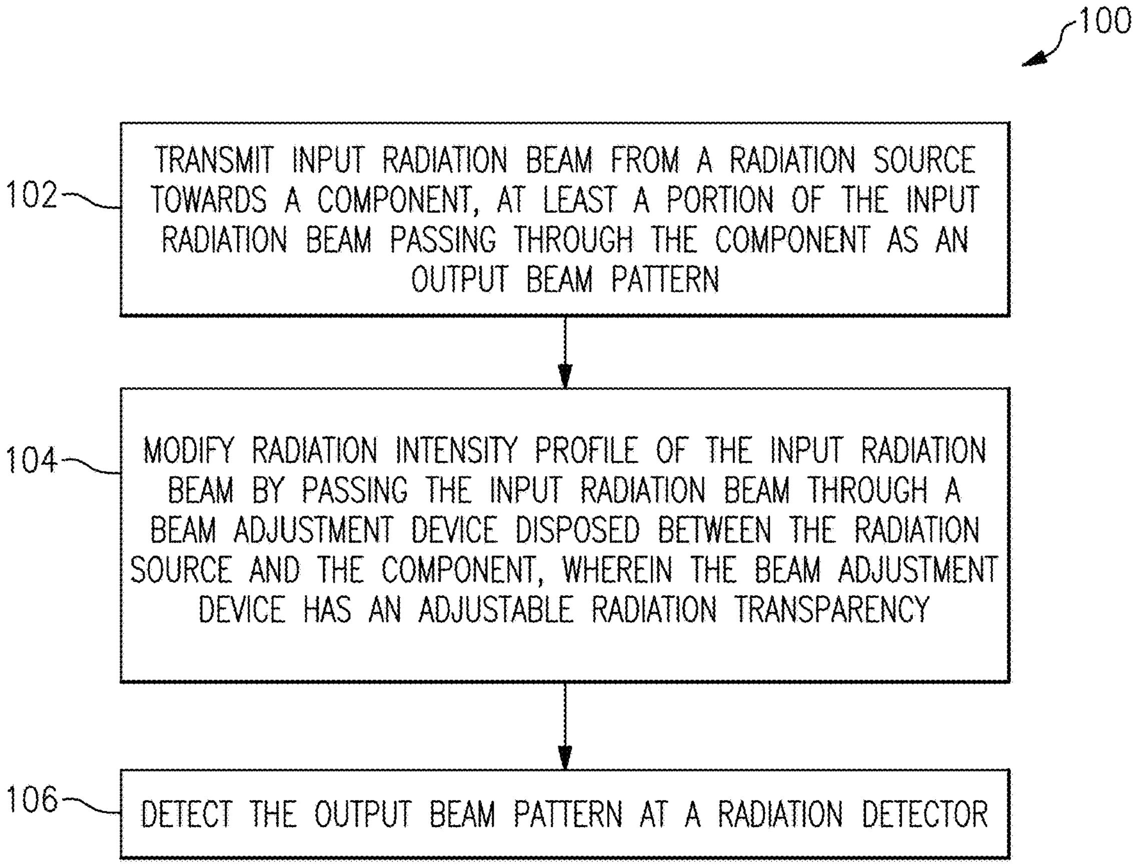
FIG. 7 is a flow chart of an example method of analyzing a component.

FIG. 7 is a flow chart of an example method 100 of analyzing a component 12. The method 100 may be implemented by the controller 28, for example.

An input radiation beam 16A is transmitted from radiation source 14 towards the component 12 (step 102), with at least a portion of the input radiation beam 16A passing through the component 12 as an output beam pattern 20.

A radiation intensity profile, and optionally also a shape, of the input radiation beam 16A is modified by passing the input radiation beam 16A through beam adjustment device 18 disposed between the radiation source 14 and the component 12 (step 104), wherein the beam adjustment device 18 has an adjustable radiation transparency. As a result of step 104, the modified input radiation beam 16B is provided. The output beam pattern 20 is detected at the radiation detector 26 (step 106).

The method 100 may include receiving a selection of a desired radiation intensity profile (and optionally also beam shape) for the input radiation beam 16 (e.g., through HMI 34), and adjusting the shape and/or radiation transparency of the input radiation beam 16 based on the selection.

The method 100 may include adjusting the radiation transparency of a portion of the plate that at least partially surrounds the aperture, such as the cavity 54 of FIG. 3 (e.g., by adding or removing a filler from the cavity to adjust the radiation transparency of the cavity 54).

Exemplary components suitable for inspection and analysis using the present invention include superalloy components, including single-crystal (SX) superalloy components. However, the present invention however is not limited to such components or materials.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A system for analyzing a component, comprising:

a radiation source configured to transmit an input radiation beam towards a component, at least a portion of the input radiation beam passing through the component as an output beam pattern;

a radiation detector configured to detect the output beam pattern; and a beam adjustment device disposed between the radiation source and the component and configured to modify a radiation intensity profile of the input radiation beam, wherein the beam adjustment device has an adjustable radiation transparency.

2. The system of claim 1, comprising a controller configured to:

receive a selection of a radiation intensity profile for the input radiation beam; and adjust the radiation transparency of the beam adjustment device based on the selection.

3. The system of claim 2, wherein:

the beam adjustment device includes a plate having an aperture; and the controller is configured to adjust the radiation transparency of a portion of the plate that at least partially surrounds the aperture.

4. The system of claim 3, wherein:

the portion of the plate that at least partially surrounds the aperture includes a cavity or an opening; and the controller is configured to add or remove a filler from said cavity or opening to adjust the radiation transparency of said cavity or opening.

5. The system of claim 4, wherein the controller is configured to select from one of a plurality of different fillers having different densities to achieve the selected radiation intensity profile of the input radiation beam.

6. The system of claim 4, wherein the controller is configured to use a liquid filler in the cavity.

7. The system of claim 4, wherein the controller is configured to use a solid filler in the opening.

8. The system of claim 2, wherein:

the system includes a plurality of plates having different radiation transparency profiles; and the controller is configured to selectively add and remove different ones of the plates from the beam adjustment device to achieve the selected radiation intensity profile of the input radiation beam.

9. The system of claim 8, wherein at least one of the plurality of plates has a varying thickness.

10. The system of claim 2, wherein the controller is configured to:

compare the detected output beam pattern with a reference beam pattern; and detect whether an anomaly exists in a crystalline structure of the component based on the comparison.

11. A method of analyzing a component, comprising:

transmitting an input radiation beam from a radiation source towards a component, at least a portion of the input radiation beam passing through the component as an output beam pattern;

modifying a radiation intensity profile of the input radiation beam by passing the input radiation beam through a beam adjustment device disposed between the radiation source and the component, wherein the beam adjustment has an adjustable radiation transparency; and detecting the output beam pattern at a radiation detector.

12. The method of claim 11, comprising:

receiving a selection of a radiation intensity profile for the input radiation beam; and adjusting the radiation transparency of the beam adjustment device based on the selection.

13. The method of claim 12, wherein:

the beam adjustment device includes a plate having an aperture; and said adjusting includes adjusting the radiation transparency of a portion of the plate that at least partially surrounds the aperture.

14. The method of claim 13, wherein:

the portion of the plate that at least partially surrounds the aperture includes a cavity or an opening; and said adjusting includes adding or removing a filler from said cavity or opening to adjust the radiation transparency of said cavity or opening.

15. The method of claim 14, wherein said adjusting includes selecting from one of a plurality of different fillers having different densities to achieve the selected radiation intensity profile of the input radiation beam.

16. The method of claim 14, wherein said adjusting includes adding a liquid filler to the cavity, or removing the liquid filler from the cavity.

17. The method of claim 14, wherein said adjusting includes adding a solid filler to the cavity, or removing the solid filler from the opening.

18. The method of claim 12, wherein said adjusting comprises:

selectively adding and removing different ones of a plurality of plates having different radiation transparency profiles from the beam adjustment device to achieve the selected radiation intensity profile of the input radiation beam.

19. The method of claim 18, wherein at least one of the plurality of plates has a variable thickness.

20. The method of claim 12, comprising:

comparing the detected output beam pattern with a reference beam pattern; and detecting whether an anomaly exists in a crystalline structure of the component based on the comparison.

* * * * *